Sept. 22, 1925. 1,554,638
A. McLEOD
BREAD CUTTER
Filed Oct. 24, 1924
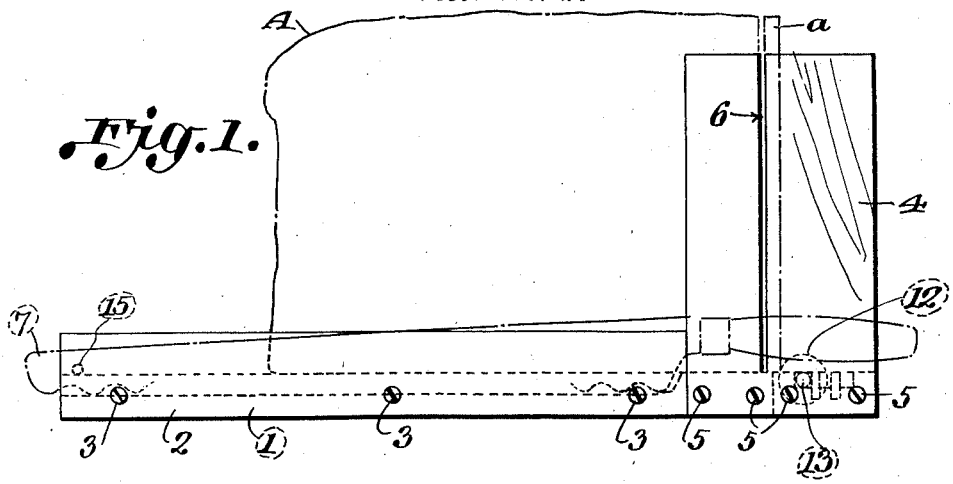
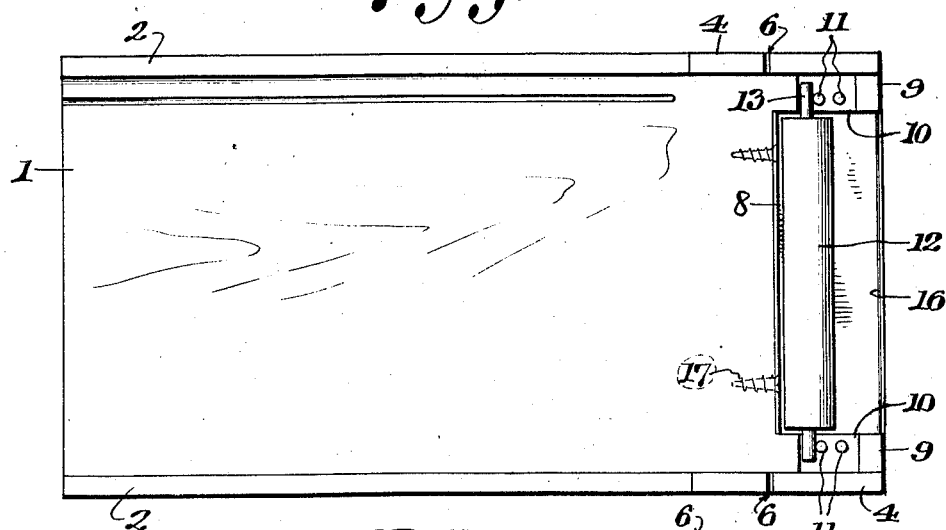
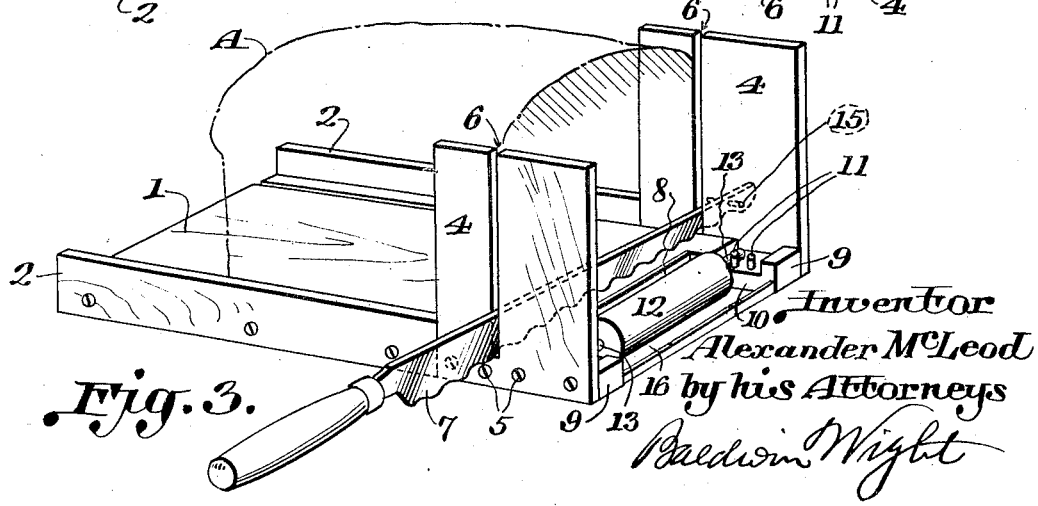
Inventor
Alexander McLeod
by his Attorneys
Baldwin Wight Patented Sept. 22, 1925.

1,554,638

UNITED STATES PATENT OFFICE.

ALEXANDER McLEOD, OF BILLINGS, MONTANA.

BREAD CUTTER.

Application filed October 24, 1924. Serial No. 745,587.

*To all whom it may concern:*

Be it known that I, ALEXANDER MCLEOD, a citizen of the United States, and resident of Billings, in the county of Yellowstone and State of Montana, have invented certain new and useful Improvements in Bread Cutters, of which the following is a specification.

In slicing bread from the loaf it is always desirable to cut slices of even and uniform thickness, and to be able to vary this thickness as desired. More or less complicated machines have been devised for this purpose, but these are ordinarily too expensive for household use.

An object of my invention is to provide a device which will enable any one to cut bread of uniform thickness and to vary the thickness of the slices as desired, and to construct such a device which will be suitable for household use.

Another object of the invention is to produce a device of this character which will be simple and efficient, but which can be manufactured at such a low cost as to be within the reach of every one.

Other objects of the invention will be apparent from the following detailed description and appended claims.

In the drawings:

Figure 1 is a side elevation of the device showing a loaf in position with a slice cut and the knife in the position it occupies when not in use.

Figure 2 is a top plan view of the device.

Figure 3 is an isometric view of the device with the knife in cutting position.

The device comprises a base member 1 to which are attached side members 2 by means of screws 3 or in any other suitable manner. These side members 2 are relatively narrow and in combination with the base member 1 form a shallow trough in which a loaf A is adapted to rest and along which it may slide. Near one end of the base are standards 4 which are attached to the base by screws 5 or in any other suitable manner. These standards 4 should be high enough to reach substantially to the top of any ordinary loaf of bread. Each standard is provided with a slot 6 extending from the top thereof down to the base member 1. This slot is wide enough to receive without binding the usual bread knife 7, but must not be wide enough to allow undue play.

The end of the base member 1 adjacent the standards 4 is cut out as indicated at 8 forming two arms 9, the outer ends of which are flush with the edges of the standards 4. In the top of these arms are depressions 10 provided with vertical pins 11. A roller 12 has pivots 13 extending axially therefrom and these pivots are adapted to rest on the bottom of the depressions 10. The position of the roller is determined by the pins 11, and since the end of the loaf rests against the roller when the loaf is being cut, it is evident that the thickness of the slice may be determined by the position of the roller.

The trough formed by the base 1 and side members 2 is preferably wider than the usual loaf and the base is provided with a longitudinal slot 14 extending from the standards to the opposite end of the base. When not in use the knife 7 may be placed with the cutting edge in this slot and the handle resting on the roller 12 as shown in Figure 1. Near the outer end of the knife it is provided with a pin 15 extending therethrough which pin prevents the knife from falling through the slot when placed therein. The pin also has the function of preventing accidental withdrawal of the outer end of the knife from the slot 6 when the knife is in use. This is particularly desirable when the loaf is considerably narrower than the trough.

As shown in Figure 1, a slice *a* when cut rests at its lower end against the roller 12, and a movement of the loaf A to the right in said figure will displace this cut slice and bring the end of the loaf against the roller in position to cut the next slice. If desired to cut wider slices the roller will be placed with the pivots 13 between the pins 11 or between the outer pins and the outer walls of the depressions 10.

If desired a crumb tray 16 may be attached by screws 17 to the base plate as indicated, this tray fitting within the cut out 8 and underlying the roller 12.

While the device is illustrated as constructed of wood, it is obvious that it may be made of any desired material or materials. Various detail changes may be made without departing from the spirit of the invention which is to be regarded as limited only by the scope of the appended claims.

I claim as my invention:

1. A bread cutter comprising a base member for supporting a loaf of bread, vertically arranged slotted knife guides on opposite sides of the base member and a loaf gage in the form of a freely rotatable roller mounted on the base member adjacent the knife guides.

2. A bread cutter comprising a base member for supporting a loaf of bread, vertically arranged slotted knife guides on opposite sides of the base member and a rotatable knife gage mounted in open bearings on the base member adjacent the knife guides.

3. A bread cutter comprising a loaf supporting base member having a cut-out portion at one end to receive a rotatable loaf gage, vertically arranged slotted knife guides on opposite sides of the base member, a series of open bearings on opposite sides of the base member adapted to receive the loaf gage and a rotatable loaf gage adjustably mounted in said bearings.

In testimony whereof, I have hereunto subscribed my name.

ALEXANDER McLEOD.